United States Patent [19]

Ioi et al.

[11] Patent Number: 5,260,629
[45] Date of Patent: Nov. 9, 1993

[54] CONTROL DEVICE FOR ROBOT IN INERTIAL COORDINATE SYSTEM

[75] Inventors: Kiyoshi Ioi; Osamu Noro; Osamu Miki, all of Akashi; Takashi Katsuragawa, Kakogawa, all of Japan

[73] Assignee: Kawasaki Jukogyo Kabushiki Kaisha, Hyogo, Japan

[21] Appl. No.: 719,612

[22] Filed: Jun. 24, 1991

[30] Foreign Application Priority Data

Jun. 27, 1990 [JP] Japan .................. 2-170571

[51] Int. Cl.$^5$ .................. G05B 19/42; G06F 15/46
[52] U.S. Cl. .................. 318/568.19; 318/567; 318/573; 901/9; 364/150; 395/83
[58] Field of Search .................. 318/560–646; 901/3, 6, 9, 12, 15–23; 395/80–89; 364/150

[56] References Cited

U.S. PATENT DOCUMENTS

| | | | |
|---|---|---|---|
| 4,147,966 | 4/1979 | Kain et al. ................. | 318/327 |
| 4,178,632 | 12/1979 | Anthony ................. | 318/568 |
| 4,283,764 | 8/1981 | Crum et al. ................. | 318/628 X |
| 4,367,532 | 1/1983 | Crum et al. ................. | 318/628 X |
| 4,433,382 | 2/1984 | Cunningham et al. ................. | 364/474 |
| 4,510,428 | 4/1985 | Dunne ................. | 318/632 |
| 4,580,085 | 4/1986 | Eto et al. ................. | 318/565 |
| 4,580,229 | 4/1986 | Koyama et al. . | |
| 4,603,284 | 7/1986 | Perzley ................. | 318/632 X |
| 4,621,332 | 11/1986 | Sugimoto et al. ................. | 364/513 |
| 4,639,652 | 1/1987 | Takahashi et al. ................. | 318/568 |
| 4,659,971 | 4/1987 | Suzuki et al. ................. | 318/568 |
| 4,670,849 | 6/1987 | Okada et al. ................. | 364/170 |
| 4,691,152 | 9/1987 | Ell et al. ................. | 318/616 |
| 4,718,078 | 1/1988 | Bleidorn et al. . | |
| 4,725,942 | 2/1988 | Osuka ................. | 364/150 |
| 4,734,866 | 3/1988 | Bartelt et al. . | |
| 4,792,737 | 12/1988 | Goff et al. ................. | 318/615 |
| 4,843,293 | 6/1989 | Futami ................. | 318/609 |
| 4,864,209 | 9/1989 | Seki et al. ................. | 318/611 |
| 4,868,473 | 9/1989 | Kato ................. | 318/568.23 |
| 4,887,015 | 12/1989 | Kurakake et al. ................. | 318/609 |
| 4,887,307 | 12/1989 | Orii et al. ................. | 318/465 X |
| 4,906,907 | 3/1990 | Tsuchihashi et al. ................. | 318/568.22 |
| 4,916,375 | 4/1990 | Kurakake et al. ................. | 318/630 |
| 4,975,856 | 12/1990 | Vold et al. ................. | 364/513 |
| 4,999,557 | 3/1991 | Inoue ................. | 318/609 |
| 5,006,770 | 4/1991 | Sakamoto et al. ................. | 318/561 |

FOREIGN PATENT DOCUMENTS

| | | |
|---|---|---|
| 0167080 | 1/1986 | European Pat. Off. . |
| 0172666 | 2/1986 | European Pat. Off. . |
| 0215271 | 3/1987 | European Pat. Off. . |
| 0336174 | 10/1989 | European Pat. Off. . |

OTHER PUBLICATIONS

Resolved Motion Rate Control of Space Robotic Manipulators with Generalized Jacobian Matrix, by Yoji Umetani and Kazuya Yoshida, JRSJ vol. 7, No. 4, Aug., 1989, pp. 63–73.

On the Dynamics of Manipulators in Space Using the Virtual Manipulator Approach by Z. Vafa and S. Dubowsky, 1987 IEEE, pp. 579–585.

Experiments on the Control of a Satellite Manipulator by Harold L. Alexander, Robert H. Cannon, Jr.—Proc. Material Handling Research Focus, Georgia Institute of Technology, pp. 1–10 (1986).

Sensor Feedback Control of Space Manipulators by Yasuhiro Masutani, Fumio Miyazaki and Suguru Arimoto—Pre-Prints of Fifth Lectures of Robotics Society of Japan, pp. 245–245, 1987.

*Primary Examiner*—Paul Ip
*Attorney, Agent, or Firm*—Oliff & Berridge

[57] ABSTRACT

The present invention discloses a control device containing a device detecting a velocity or an acceleration parameter of the main robot body. The velocity or acceleration parameters are expressed in a robot coordinate system and is detected from the detection device. The output from the detection device is even added to a desired value that is expressed in an absolute coordinate system that is in an inertial reference frame for an arm of the robot. In this way, the robot arm can be made to follow any desired path, by using desired positions in the absolute coordinate system that is an inertial coordinate system.

3 Claims, 5 Drawing Sheets

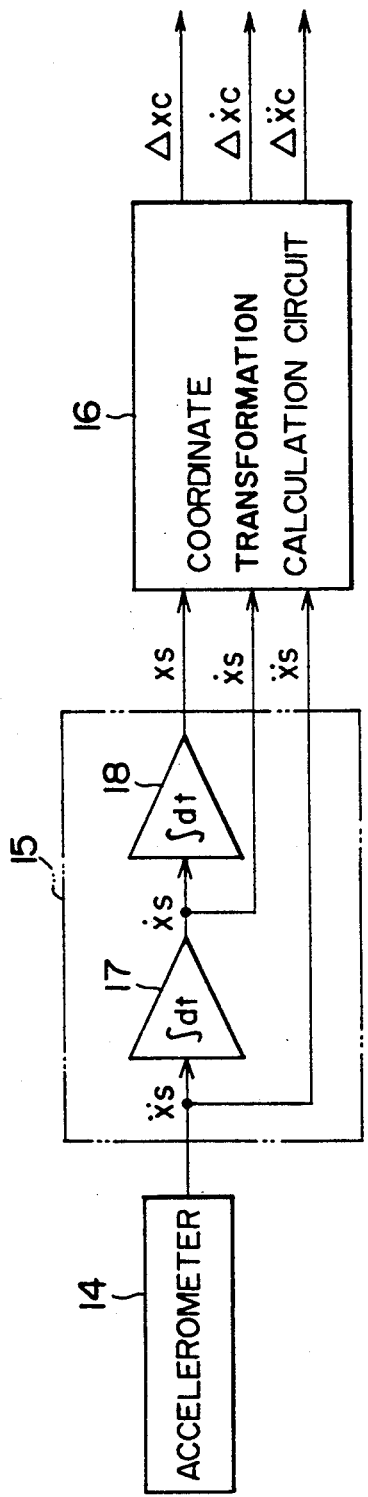
F I G. 3
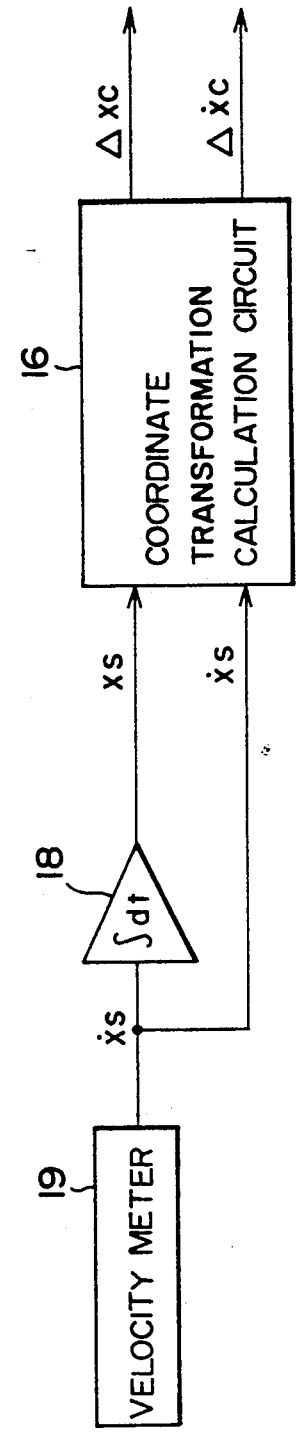
F I G. 4

CONTROL DEVICE FOR ROBOT IN INERTIAL COORDINATE SYSTEM

BACKGROUND OF THE INVENTION

The present invention relates to a control device for a robot that operates in an inertial coordinate system, in other words, one that operates in an inertial region such as in space or under the sea where the force of gravity cannot be used. In particular, it relates to a control device for a robot that moves a robot arm to perform a task while free flying in space or under the sea.

With conventional techniques, if a hand of a floating robot arm is to be made to follow a target path in an operating coordinate system (an inertial system), the main body of the robot is forced to move by the reaction force generated by the arm's movement, and this causes a problem in that it is difficult for the hand to accurately follow the path.

A technique of generating velocity instructions by taking into consideration the dynamic behavior of the entire system, including the main body of the robot, has been proposed in "Resolved Motion Rate Control of Space Robotic Manipulators with Generalized Jacobian Matrix", by Umetani and Yoshida, Journal of the Robotics Society of Japan, Vol. 7, No. 4, pp. 63–73, 1989. Since this technique provides velocity control, the problem remains of how to generate target position and orientation instructions, and the method used to generate velocity instructions necessitates massive calculations such as computations of mass characteristics, centers of mass, and inertial tensors for each robot arm, so the technique cannot cope readily with changes in parameters.

Various other techniques have been proposed for controlling movement of the main robot body caused by reaction force, by adding propulsion actuators to the main robot body or by adding torquers that generate torque. These techniques are described in papers such as "On the Dynamics of Manipulators in Space Using the Virtual Manipulator Approach," Z. Vafa and S. Dubowsky, Proc IEEE Int. Conf. on Robotics & Automation, pp. 579–585 (1987), and "Experiments on the Control of a Satellite Manipulator," H. L. Alexander and R. H. Cannon, Proc. Material Handling Research Focus, Georgia Institute of Technology, pp. 1–10 (1986). However, these techniques require some form of propulsion generation means or torquer, so they are not advantageous from the energy-saving point of view.

Other proposed techniques for controlling a robot use sensors in the end of the robot hand to measure a relative position or relative velocity toward an object that the robot hand is to approach, and feed this value back to the robot to control it. Such techniques are described in, for example, "Sensor Feedback Control of Space Manipulators," by Masutani, Miyazaki, and Arimoto, Pre-prints of Fifth Lectures of Robotics Society of Japan, pp. 245–248, 1987. Since these techniques require a target object, and they also require something to act as some sort of verification mark as well, they cannot be used to move a hand of a robot arm in a desired manner in places where there are no surrounding objects.

SUMMARY OF THE INVENTION

An objective of the present invention is to provide a robot control device in an inertial coordinate system that has a simple construction and that can accurately determine the position of an arm in an inertial frame in which a task is performed, and can drive the arm.

According to the present invention, there is provided a control device for a robot in an inertial coordinate system, comprising: a robot provided with an arm in a main robot body thereof, said arm being drivable; a desired value setting means for setting a desired value expressed in an absolute coordinate system in an inertial system of said arm; a detection means for detecting a velocity or acceleration expressed in a robot coordinate system of said main robot body; and a control means for correcting said desired value in response to outputs from said desired value setting means and said detection means, whereby said robot arm is driven in accordance with the thus-corrected value.

In accordance with the present invention, a main robot body is provided with a detection means that detects a velocity or an acceleration expressed in a robot coordinate system with respect to the main robot body, an output from the detection means is superimposed as a correction to a desired value of an arm, expressed in an absolute coordinate system and output from a desired value setting means, and a modified path is generated for the arm in an inertial reference frame. Therefore, even if the main robot body changes position while floating in the inertial reference frame, the arm can be made to accurately achieve any desired target value.

The arm can be made to move along a desired path even when there are no target objects or marks, and there is no need for means of generating propulsion forces for the main robot body or means of generating torque. In other words, all that is necessary is that the velocity or acceleration of the main robot body is detected by the detection means mounted in the main robot body, and a correction is added to a path instruction which is a desired value of the arm generated when the main robot body is assumed not to be moving, so that accurate path control can be enabled for the arm. Therefore, the present invention ensures that it is no longer necessary to accurately identify each of the physical constants of the robot arm, and the arm can be made to follow any desired target path without needing any kind of modification, even if a parameter of the arm should change.

Therefore, since there is no need for a target object or mark with the present invention, the arm can be made to achieve a desired value or follow a desired path without having to deviate within the environment. Since there is no need for means of obtaining a propulsion force for the main robot body or a means of generating torque, the present invention has a significant energy-saving effect, and since there is no need to identify and calculate physical constants for each individual arm, the load on the processing means such as a computer can be reduced, increasing robust controllability.

BRIEF DESCRIPTION OF THE DRAWINGS

FIG. 3 is a block diagram showing a structure relating to an acceleration detection means 14;

FIG. 4 is a block diagram showing a structure relating to a velocity detector 18 of another embodiment of the present invention;

DESCRIPTION OF THE PREFERRED EMBODIMENTS

Figure 1:
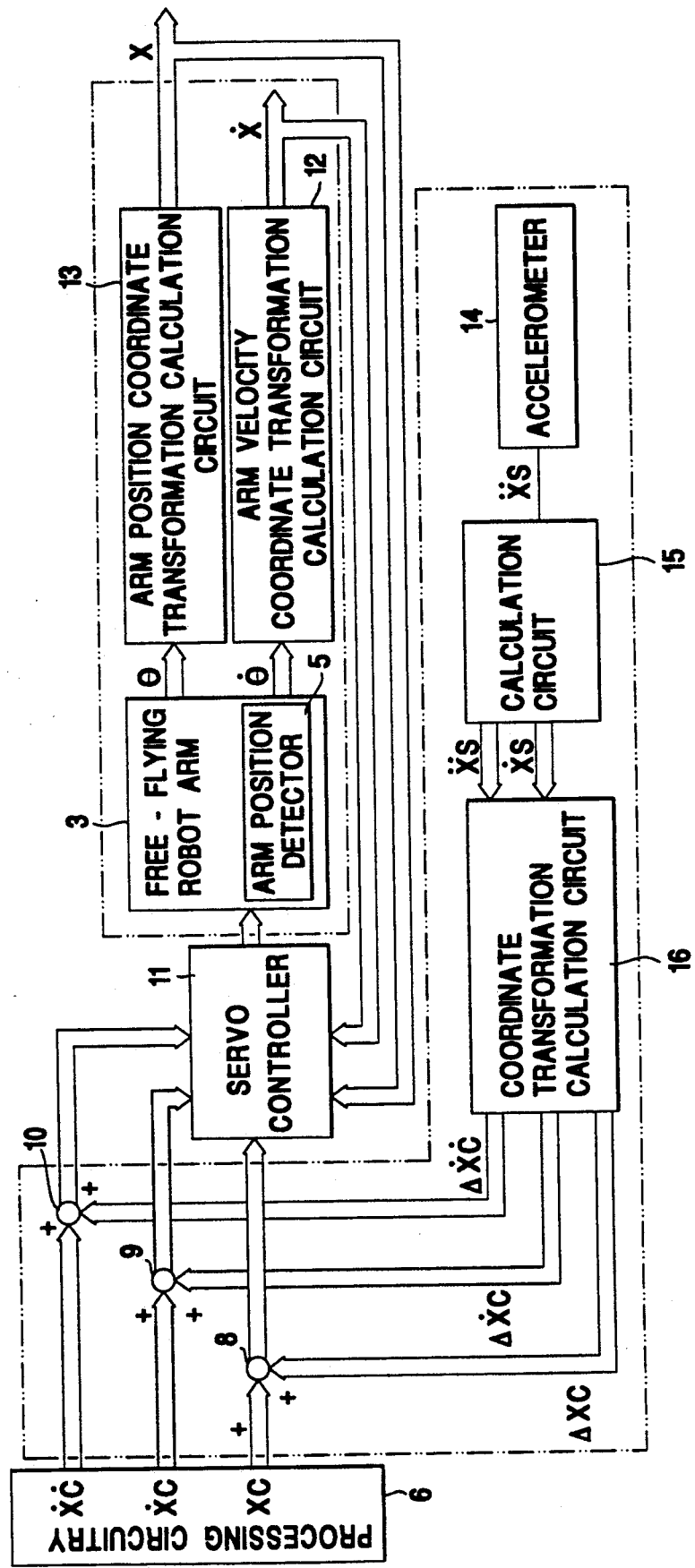
FIG. 1 is a block diagram of the entire structure of one embodiment of the present invention.
Figure 2:
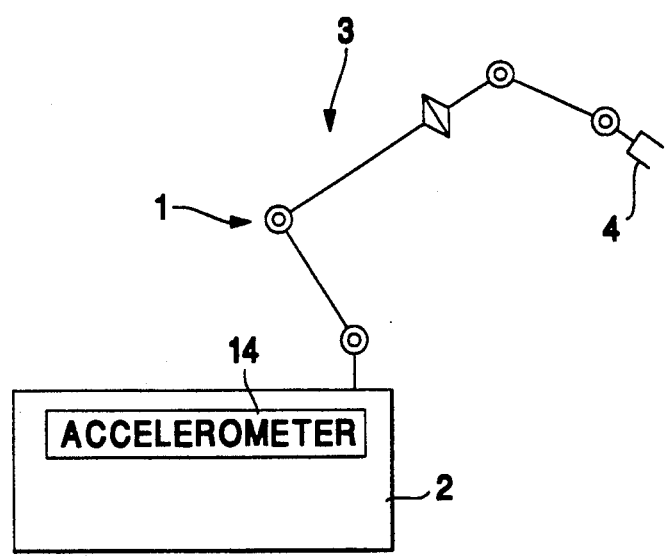
FIG. 2 is a simplified side view of a robot 1.

A block diagram of the entire structure of one embodiment of the present invention is shown in FIG. 1, and a simplified side view of a robot thereof is shown in FIG. 2. A robot 1 floats in an inertial system such as in space or under the sea where the force of gravity cannot be used. This robot 1 is configured of a main robot body 2 and a number of arms 3 (for example, six arms) that each have a number of degrees of freedom, and an operating end 4 of each of the arms 3 is able to perform a task in an inertial reference frame. The main robot body 2 is provided with a detection means 14 that detects acceleration.

When it is assumed that the main robot body 2 is not moving, processing circuitry 6 realized by a microcomputer or the like extracts signals indicating an instruction position xc, an instruction velocity $\dot{x}c$, and an instruction acceleration $\ddot{x}c$ expressed in absolute coordinates within the inertial reference frame, and sends them via adder circuits 8, 9, and 10 to a servo controller 11. This servo controller 11 drives drive means of the arms 3 of the robot 1. The current position x of the operating end 4 of each arm 3, expressed in a coordinate system fixed with respect to the main robot body 2, is calculated from values from position detectors at each of the joints of the arm 3 and from the lengths of links forming the arm 3. The current velocity $\dot{x}$ of the operating end 4 of the arm 3 is also calculated using outputs of velocity detectors or differential calculus on outputs of position detectors at each of the joints of the arm 3, and from the link lengths. A calculation circuit 12 generates the current velocity $\dot{x}$ of the operating end 4 of the arm 3 from the position of each of the joints of the arm 3, in coordinates fixed with respect to the main robot body 2, and a calculation circuit 13 generates the current position x of the operating end 4 of the arm 3 from the velocity of each of the joints of the arm 3, in coordinates fixed with respect to the main robot body 2, but any means similar to a coordinate conversion calculator for a general-purpose fixed industrial robot may be used therefor.

In FIG. 1, $\theta$ and $\dot{\theta}$ represent the displacement and velocity of each of the joints of the arm 3. The signals indicating the current velocity $\dot{x}$ and the current position x are sent to the servo controller 11 which applies negative feedback control to make the operating end 4 of the arm 3 achieve desired values supplied from the adder circuits 8, 9, and 10.

The acceleration detection means 14 in accordance with the present invention is mounted in the main robot body 2. This acceleration detection means 14 detects the acceleration of the main robot body 2 in the robot coordinate system.

An acceleration $\ddot{x}s$ in the robot coordinate system detected by the acceleration detection means 14 is sent from a calculation circuit 15 to a coordinate conversion calculation circuit 16, it is converted from the robot coordinate system to an absolute coordinate system (inertial coordinate system), and a thus-converted displacement $\Delta xc$, velocity $\Delta \dot{x}c$, and acceleration $\Delta \ddot{x}c$ for the main robot body 2 are extracted and sent to the corresponding adder circuits 8, 9, and 10.

A block diagram of a specific example of the structure relating to the acceleration detection means 14 is shown in FIG. 3. The acceleration $\ddot{x}s$ detected by the acceleration detection means 14 is integrated by an integration means 17 of the calculation circuit 15, to obtain a velocity $\dot{x}s$ of the main robot body 2, and this is further integrated by another integration means 18 to obtain a displacement xs. The acceleration $\ddot{x}s$ detected by the acceleration detection means 14 and the velocity $\dot{x}s$ and xs based thereon are all expressed in the robot coordinate system, and they are converted by the coordinate conversion calculation circuit 16 described above to obtain the corresponding displacement $\Delta xc$, velocity $\Delta \dot{x}c$, and acceleration $\Delta \ddot{x}c$ in the absolute coordinate system that is the inertial reference frame.

A detection means 19 that detects the velocity of the main robot body 2 could be provided as another embodiment of the present invention, as shown in FIG. 4. In this case, the velocity $\dot{x}s$ in the robot coordinate system is detected by the velocity detection means 19 and is integrated by an integration circuit 18 to obtain a displacement xs in the robot coordinate system. These values $\dot{x}s$ and xs in the robot coordinate system are sent to a coordinate conversion calculation circuit 16, to obtain a displacement $\Delta xc$ and velocity $\Delta \dot{x}c$ in the absolute coordinate system (the inertial reference frame) that are sent to adder circuits 8 and 9. In this embodiment, the adder circuit 10 is omitted, and the instruction acceleration $\ddot{x}c$ is not generated.

Figure 5:
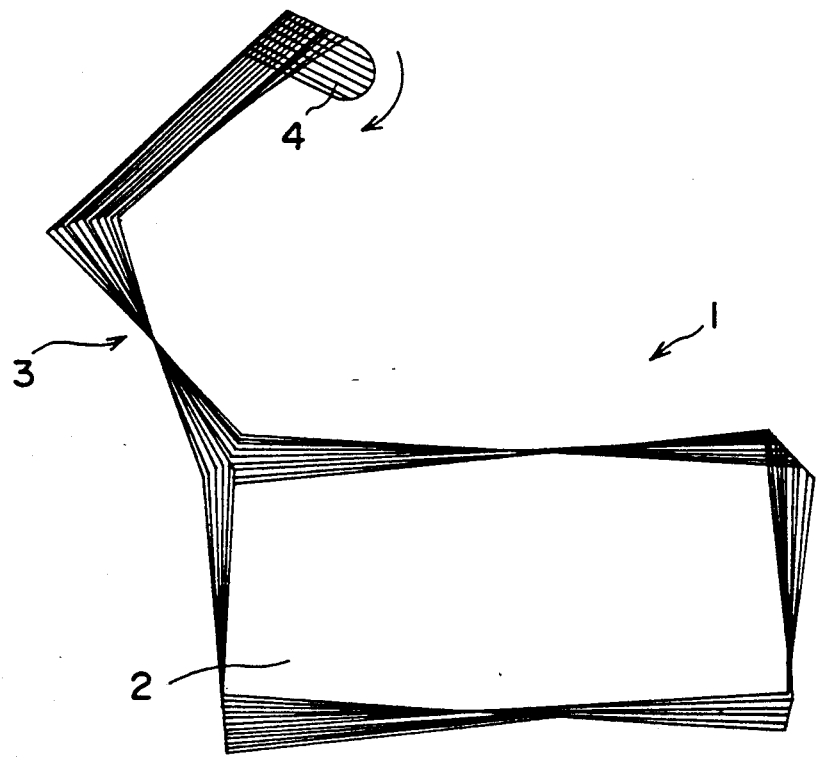
FIG. 5 shows a simplified robot 1 illustrating the results of experiments making use of the present invention.
Figure 6:
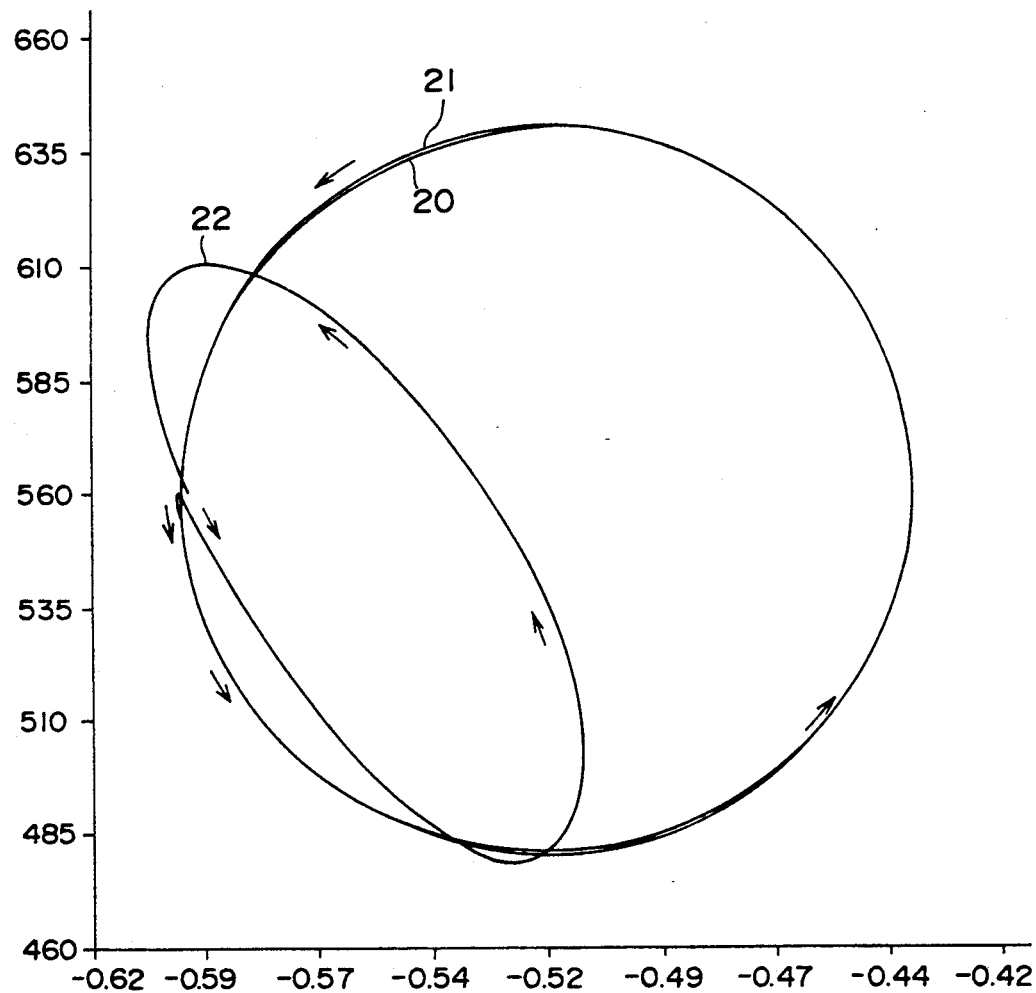
FIG. 6 shows the results of experiments making use of the present invention.

Results of experiments using the present invention are shown in FIG. 5. The main robot body 2 of the robot 1 is provided with an arm 3 that has three degrees of freedom, and the status at each instant as the operating end 4 is made to draw a circle by movement of the arm 3 is shown. The circle drawn using the operating end 4 is illustrated by the shape denoted by reference number 20 in FIG. 6. The desired path that consists of target values of the operating end 4 in the inertial system is denoted by reference number 21. It is clear from this figure that use of the present invention ensures that the operating end 4 can be moved through a path extremely close to the desired path in the inertial system.

Figure 7:
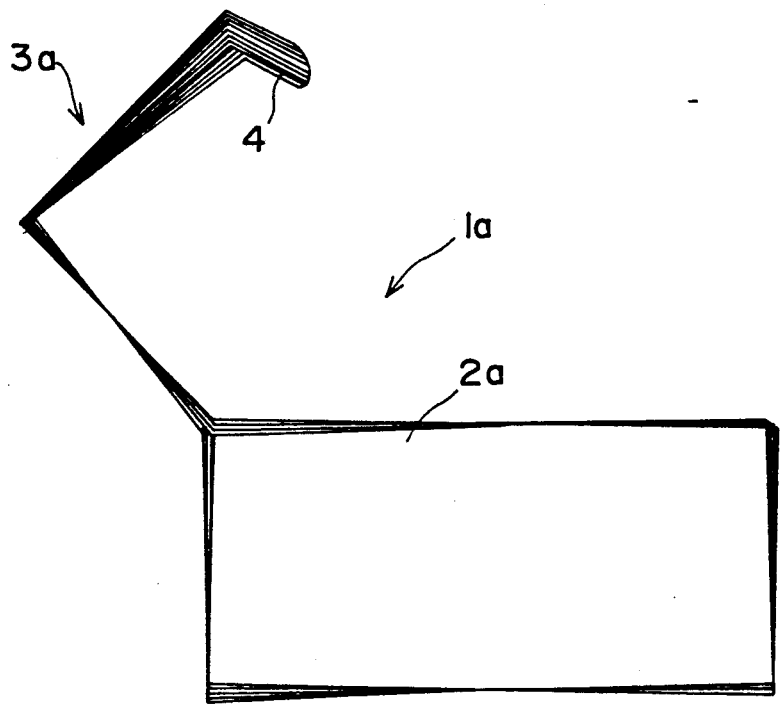
FIG. 7 is a simplified diagram of a robot 1a used as a comparison example.

In contrast, although a main robot body 2a of a comparison example shown in FIG. 7 is provided with a similar arm 3a, the main robot body 2a does not have the detection means 14 or 18 of the present invention. In this case, the operating end 4 thereof draws a greatly abbreviated oval path, as shown by reference number 22 in FIG. 6, in comparison with the desired path 21 in the inertial system. Therefore it is clear from this figure that this path diverges widely from the target path 21.

This experiment shows that the robot arm of the present invention can accurately follow a path in an inertial system.

What is claimed is:

1. A control device for a robot referenced to an inertial coordinate system, comprising:
   a robot provided with an arm in a main robot body thereof, said arm being drivable;
   desired value setting means for setting a desired value expressed in an absolute coordinate system in an inertial system of said arm;
   detection means for detecting at least one of a velocity and an acceleration output in a robot coordinate system of said main robot body, wherein said detection means comprises an accelerometer mounted in said main robot body and a two-stage integrator for generating both a velocity signal and a position signal from an output from said accelerometer; and control means for correcting said desired value in response to outputs from said detection means, whereby said robot arm is driven in accordance with a corrected desired value.

2. A control device for a robot in accordance with claim 1, wherein said detection means further comprises a coordinate conversion calculation means for converting a velocity and a position expressed in said robot coordinate system into a velocity and a position expressed in said absolute coordinate system.

3. A control device for a robot in accordance with claim 1, wherein said detection means further comprises a coordinate conversion calculation means for converting an acceleration, a velocity, and a position expressed in said robot coordinate system into an acceleration, a velocity, and a position expressed in said absolute coordinate system.

* * * * *